(12) United States Patent
Budweg et al.

(10) Patent No.: US 7,667,345 B2
(45) Date of Patent: Feb. 23, 2010

(54) DEVICE FOR AN ADJUSTING MECHANISM, SAID ADJUSTING MECHANISM AND METHOD

(75) Inventors: Mario Budweg, Hückeswagen (DE); Wolfgang Pellenz, Rheinbach (DE); Alexander Czinki, Bonn (DE); Ralf Hoge, Radervormwald (DE); Richard Boudinot, Leverkusen (DE); Piotr Szablewski, Wuppertal (DE)

(73) Assignee: Johnson Controls GmbH, Burscheid (DE)

( * ) Notice: Subject to any disclaimer, the term of this patent is extended or adjusted under 35 U.S.C. 154(b) by 772 days.

(21) Appl. No.: 10/556,515

(22) PCT Filed: May 7, 2004

(86) PCT No.: PCT/EP2004/004920

§ 371 (c)(1),
(2), (4) Date: Nov. 14, 2005

(87) PCT Pub. No.: WO2004/098945

PCT Pub. Date: Nov. 18, 2004

(65) Prior Publication Data

US 2006/0250009 A1 Nov. 9, 2006

(30) Foreign Application Priority Data

May 12, 2003 (DE) ................. 103 21 426
Sep. 9, 2003 (DE) ................. 103 41 866

(51) Int. Cl.
*A47C 1/00* (2006.01)
(52) U.S. Cl. ...................... 307/9.1; 307/10.1
(58) Field of Classification Search .................. 307/9.1, 307/10.1
See application file for complete search history.

(56) References Cited

U.S. PATENT DOCUMENTS

| 3,433,524 | A | * | 3/1969 | Close ................. 296/65.17 |
| 3,516,704 | A | * | 6/1970 | Riester ............... 296/65.17 |
| 3,761,730 | A | | 9/1973 | Wright |
| 5,613,733 | A | | 3/1997 | Miller, Sr. et al. |

FOREIGN PATENT DOCUMENTS

| DE | 38 03 602 A1 | 8/1989 |
| DE | 691 13 243 T2 | 5/1996 |
| DE | 197 30 646 A1 | 1/1999 |
| DE | 198 51 456 A1 | 5/2000 |
| WO | WO 00/76802 A1 | 12/2000 |

* cited by examiner

*Primary Examiner*—Fritz M Fleming
(74) *Attorney, Agent, or Firm*—Foley & Lardner LLP (57) ABSTRACT

A device for blocking and for releasing an adjusting mechanism having at least two parts which are movable relative to each other is disclosed. The device comprises a blocker configured to be brought at least into a blocking position and a release position relative to the adjusting mechanism. The device further comprises an actuator for changing the position of the blocker between the blocking position and the release position.

20 Claims, 5 Drawing Sheets

DEVICE FOR AN ADJUSTING MECHANISM, SAID ADJUSTING MECHANISM AND METHOD

CROSS-REFERENCE TO RELATED PATENT APPLICATIONS

Germany Priority Application DE 103 21 426.7, filed May 12, 2003 including the specification, drawings, claims and abstract, is incorporated herein by reference in its entirety. Germany Priority Application DE 103 41 866.0, filed Sep. 9, 2003 including the specification, drawings, claims and abstract, is incorporated herein by reference in its entirety. This application is a National Stage of US Application PCT/EP2004/004920, filed Jul. 5, 2004, incorporated herein by reference in its entirety.

FIELD OF THE INVENTION

The invention relates generally to a device for blocking and for releasing an adjusting mechanism for use in a vehicle seat. In particular the invention relates to for components of motor vehicles—such as, for example, seats, sliding roofs and more of the like which can be set mechanically into a plurality of positions, for operating elements or actuating elements which permit the mechanical setting of the components to be placed at locations which can easily be reached and can easily be seen.

BACKGROUND OF THE INVENTION

German laid-open specification DE 198 51 456 discloses a device and a method for adjusting movable parts, in which a motor having a method of operation is provided for adjusting the movable parts. The motor is provided both for adjusting the movable parts and for providing pneumatic energy.

A disadvantage of this known device and the known method is that a mechanical adjustment of the movable parts is entirely taken over by the motor, which makes the device expensive and complex.

SUMMARY OF THE INVENTION

The present invention, in one embodiment, relates to a device for blocking and for releasing an adjusting mechanism, in which the adjustment of the adjusting mechanism itself is not provided automatically, for example electrically or pneumatically, but rather in which the setting of the adjusting mechanism from a first possible setting to a second possible setting is carried out manually. Only the unlocking or the release of the adjusting mechanism is undertaken—triggered by the actuation of an actuating element—in an automated manner, for example pneumatically or electrically, by means of an unlocking actuator. As a result, the device according to the invention can be produced to be small, lightweight and cost-effective, for example because a large-sized, heavy and expensive motor for automated adjustment is not necessary. According to one embodiment of the invention there is a device for blocking and for releasing an adjusting mechanism, in which the adjusting mechanism is provided at least in two settings, the device having a blocking means which can be brought at least into a blocking position and into a release position relative to the adjusting mechanism, an adjustment of the adjusting mechanism from its first setting into its second setting being provided only when the blocking means is in its release position, a change in position of the blocking means from its blocking position into its release position being provided by means of an electric and/or pneumatic unlocking actuator. The device of the present invention has the advantage that the unlocking actuator does not have to be actuated manually. This makes it unnecessary to position the actuating element for the unlocking actuator at a location at which a user of the adjusting mechanism firstly cannot comfortably bring about an unlocking of the adjusting mechanism, or makes it unnecessary to provide complicated mechanical assisting means which, although they permit an unlocking of the adjusting mechanism at a comfortably accessible location, are large, heavy and expensive to produce and to fit for this purpose. Furthermore, it is advantageously possible according to the invention to provide an actuating element in such a manner that the effort for its actuation is comparatively low. As a result, even users who are physically relatively weak can operate the adjusting mechanism in a simple and safe manner. In another embodiment of the present invention, it is advantageously possible to provide an operation of the actuating element in which great forces do not have to be applied either for adjusting the adjusting mechanism or for actuating the unlocking actuator.

In one embodiment of the present invention there is a device for unlocking and for maintaining the unlocking of an adjusting mechanism, it being possible for the adjusting mechanism to be set in a first setting position and in a second setting position, the adjusting mechanism having a reversibly releasable and blockable blocking means, an adjustment of the adjusting mechanism from its first setting position into its second setting position being provided only when the blocking means is released, the release of the blocking means furthermore being provided by means of an electric and/or pneumatic unlocking actuator, an activation of the unlocking actuator being provided at the beginning of a setting period and a deactivation of the unlocking actuator being provided at the end of the setting period, and the device comprising detection means for detecting the end of the setting period or detection means of this type being assigned to the device. This enables a particularly user-friendly operation of the adjusting mechanism. Furthermore, a multiplicity of different setting situations or a multiplicity of possible termination criteria of the setting or adjusting operation of the adjusting mechanism is possible.

A change in position of the blocking means from its release position into its blocking position is preferably provided by means of a mechanical and/or electric and/or pneumatic locking actuator. The locking actuator is used for blocking the adjusting mechanism again after an adjusting operation and can therefore be safely used as operation, for example of a motor vehicle, continues.

A change in position of the blocking means from its release position into its blocking position is preferably provided by means of a spring as mechanical locking actuator. As a result, a particularly simple and cost-effective solution for a locking actuator is possible.

In a further embodiment, the change in position of the blocking means from its blocking position into its release position can be carried out counter to an action of force of the locking actuator. This ensures that the blocking position of the blocking means is always possible—even in the event of a functional failure of the unlocking actuator. This leads to the adjusting mechanism being stable and blocked in the event of an unexpected event.

In another embodiment, when the blocking means is in its blocking position, a frictional and/or non-positive action of the blocking means on the adjusting mechanism is preferably provided. This ensures in a simple manner that the adjusting mechanism will be blocked.

In a further embodiment, the unlocking actuator is a pneumatic unlocking actuator to be provided with an active surface, the active surface being connected on both sides to the ambient pressure when the blocking means is in its blocking position. This leads to the adjusting mechanism being stable and blocked in an emergency situation, for example in the case of a collision, in which supplying with pneumatic energy is not ensured.

In a further embodiment when the unlocking actuator is activated, a first power requirement for releasing the blocking means is provided, and that, in order to maintain the releasing of the blocking means, a second power requirement of the unlocking actuator is provided, the second power requirement being smaller than the first power requirement. Furthermore the first power requirement of the unlocking actuator is realized by means of a first drive voltage and the second power requirement of the unlocking actuator is realized by means of a second drive voltage. Furthermore the unlocking actuator can be driven with the first power requirement at maximum during a predetermined overload period. This makes it possible to dimension the unlocking actuator to be smaller than the power required at a particular instant for unlocking, i.e. for releasing the blocking means from its blocking position into its release position. For this purpose, the unlocking actuator is therefore temporarily overloaded in such a manner that although it can withstand such a load at a particular instant, it would be consistently overloaded therewith. It is therefore advantageously possible to dimension the unlocking actuator to be smaller than the first power requirement which is briefly required or to the first drive voltage which is briefly required, in particular for thermal overloading reasons. With regard to load peaks for moving the blocking means into its release position, the unlocking actuator can therefore be under-dimensioned according to the invention and can be operated in a comparatively brief overload mode above the nominal voltage of the unlocking actuator. This reduces the costs and the weight of the device according to the invention. An unlocking actuator of this type is preferably provided as an electric actuator, with the result that different drive voltages are used for driving the said actuator at a different load requirement.

Provision is preferably furthermore made for the first and/or second power requirement to be at least partially constant in time or for the first and/or second power requirement to be variable in time. According to the invention, it is particularly preferred for the first power requirement to be provided during a first drive period and for the second power requirement to be provided during a second drive period for driving the unlocking actuator. According to the invention, it is therefore advantageously possible either to provide a continuous transition between the first and the second power requirement—for example with the effect of an exponential or quasi-exponential dropping of the drive voltage from a starting value to a second drive voltage value required long term for maintaining the release position of the blocking means—or to provide one or more discontinuous transitions between the first and second power requirement. For example, the different drive voltages for unlocking and for maintaining the unlocking may also be constant during certain time periods. According to the invention, this increases the variability and number of options for using the device according to the invention.

The different drive voltages can be realized without complicated driving, for example by means of the different voltage levels of the electrical system in a vehicle with an electrical system having different voltage levels of this type. As an alternative to this, the different drive voltages may be generated by closed-loop driving, for example by means of a pulse-width modulation method.

It is furthermore preferable for the repetition rate of an activation of the unlocking actuator to be limited or to be limited at least during a predetermined averaging period. This makes it advantageously possible that an incorrect use of the device will not lead to damage due, for example, to the unlocking actuator overloading, for example due to overheating. In this case, the repetition rate of the activation of the unlocking actuator is the number of actuations of the device such that the unlocking actuator undertakes an unlocking of the blocking means from its blocking position into its release position. If, for example, the unlocking actuator requires 30 seconds for cooling, a repetition rate of above two actuations per minute would be detected by a control device and prevented. Alternatively, in the case of a cooling time of 30 seconds, required likewise by way of example, provision may be made for, for example, five actuations to be possible over two minutes, but for no more than, for example, six actuations to ensue over an averaging period of four minutes. This enables a flexible use of the device by a user and prevents misuse. The values mentioned are understood exclusively by way of example.

In a further embodiment of the present invention, it is preferable for either the blocking means to be able to be brought into a release position and into a blocking position, in which case the blocking means can be brought from its release position into its blocking position by means of a deactivation of the unlocking actuator, or for the blocking means to be able to be brought into a release position, into a blocking position and into a standby position, in which case the blocking means can be brought from its release position into its blocking position or at least into its standby position by means of a deactivation of the unlocking actuator. In a further embodiment, it is preferable that, when there is a loss of voltage by the device or in an emergency situation, a deactivation of the unlocking actuator is provided, an emergency situation being, in particular, a crash situation and/or pre-crash situation and/or a particularly severe braking of the vehicle. The standby position is therefore characterized in that there is the possibility for changing the state of the blocking means into the locked state of the adjusting mechanism, i.e. into the blocking position of the blocking means, to be precise, without the unlocking actuator having had to be driven or without there having been a different energy requirement. In particular in the case of a loss of voltage or in the case of other emergency situations, this considerably increases the safety of the device according to the invention. According to the invention, the crash situation, i.e. the presence of an accident situation, is established in particular centrally in the vehicle—in particular by the response of acceleration sensors due to acceleration values of the vehicle that lie above threshold values. A pre-crash situation, i.e. a situation in which an accident is immediately imminent, is likewise determined according to the invention centrally in the vehicle by means of further sensors—for example ambient sensors, such as ultrasound sensors, radar sensors or optical sensors.

In a further embodiment, it is preferable for the device to comprise a signaling means or for a signaling means to be assigned to the device, it being possible for the presence of the blocking means in the standby position to be signaled by means of the signaling means. In the standby position of the device, the adjusting mechanism is not yet completely blocked—for example because teeth of gearwheels or racks that intermesh in the blocked state are not yet intermeshing— with the result that there is a safety risk at this point which is imparted to a user by the signaling means—for example an acoustic signaling means or an optical signaling means, for example a display or a loudspeaker, or a haptic signaling means, for example a vibrating display.

In a further embodiment, it is furthermore advantageous for the unlocking actuator to be provided as pneumatic unlocking actuator which interacts with a valve unit which, when a predetermined acceleration value in a predetermined direction is exceeded, deactivates the unlocking actuator. As an alternative to this, it is also possible, according to the invention, for the unlocking actuator to be provided as electric unlocking actuator which interacts with a sensor means which, when a predetermined acceleration value in a predetermined direction is exceeded, deactivates the unlocking actuator. It is therefore possible to undertake a rapid deactivation of the unlocking actuator. If, therefore, the adjusting mechanism is adjusted, for example during the journey, and during the adjusting operation there is a severe acceleration/deceleration of the vehicle, then the value unit causes the adjusting mechanism to be locked by deactivating the unlocking actuator.

According to the invention, provision may also be made advantageously to undertake such a blocking of the adjusting mechanism during the occurrence of accelerations/decelerations of the vehicle as occurred during full braking of the vehicle.

In a further embodiment, it is furthermore preferable for the actuating element to be provided as detection means for detecting the end of the setting period. By this means, the interruption-free continuation of the user's intention to maintain an unlocking once introduced by the actuation of the actuating element is detected in a simple manner. As an alternative to an actuating element as detection means for detecting the end of the setting period, it is possible according to the invention to assign further detection means either to the device or to the adjusting mechanism or else to integrate detection means of this type into the device or the adjusting mechanism. These include, for example, detection means which detect an exertion of force on various parts of the adjusting mechanism. Furthermore, these may include detection means which detect the touching of certain points of the device or the adjusting mechanism.

It is furthermore preferable for a sensor means to be assigned to the device or for the device to comprise a sensor or sensor means, it being possible for the sensor means to be used to provide an inhibiting signal which prevents an activation of the unlocking actuator. Furthermore, it is preferable for the sensor device to be a seat occupation sensor or a body contact sensor, in particular on a backrest or armrest. This makes it possible to completely prevent an actuation of the unlocking actuator in certain situations if further conditions which are required to be fulfilled—in particular those established by a sensor—are not fulfilled. For example, due to intentional or unintentional actuation of the actuating element without the presence of an actual user's requirement to adjust the adjusting mechanism—for example manifested in that a user is on the vehicle seat or that a user's back rests on the backrest or that a user has placed his arm on the armrest—an unlocking can be prevented from being carried out. Furthermore, provision may be made according to the invention for an unlocking of the adjusting mechanism to be carried out only after a certain dead time, i.e. for a signal generated by the actuating element to be evaluated as valid only after the expiry of the dead time. This makes it largely possible to prevent, for example, negative effects due to a rebounding switch. According to the invention, it can furthermore be provided that an unlocking is made possible only after the detection of a "double click" actuating signal at the actuating element.

Furthermore, in one particularly preferred embodiment, the unlocking actuator comprises a first partial unlocking actuator and a second partial unlocking actuator, the partial unlocking actuators jointly bringing about the release of the blocking means by means of different mechanical transmission ratios. It is advantageous in this connection that nonlinear force/travel profiles can be better taken into consideration in the unlocking of the adjusting mechanism. For example, a great force could be required in an initial stage of the unlocking operation and for it to be applied at a given lever length, which is selected in such a manner that the unlocking operation can be completely carried out, a comparatively large actuator would be required. According to the invention, it is now advantageously provided to connect a first actuator of smaller dimensions (also called partial unlocking actuator) to a larger lever arm in such a manner that the smaller actuator is also capable of applying the force required in the initial stage of the unlocking operation. However, there is then the problem that, due to the larger length of the lever arm, the displacement travel (of an actuator illustrated by way of example as a linear actuator) would also have to be selected to be larger although during the further course of the displacement travel, i.e. after the initial stage of the unlocking operation, a smaller force of the actuator would possibly suffice. The second partial unlocking actuator is provided for this case, which actuator—connected to a smaller lever arm—"takes over" the displacement travel after the initial stage of the unlocking operation. It is therefore possible according to the invention to compensate, on the basis of the geometry of the lever, for a nonuniform force/travel profile during the unlocking and nevertheless to use comparatively smaller and less expensive components.

In a further embodiment, the present invention furthermore relates to an adjusting mechanism which interacts with a device according to the invention. An adjusting mechanism of this type can advantageously be adjusted from a first setting into a second setting by a movement of two parts which originates from an action of a force applied to the parts. This makes it possible to minimize the effort and time required for changing the position of the adjusting mechanism, since, for example, adjusting elements—such as, for example, setting wheels for adjusting a backrest—do not have to be moved manually with great effort or a large transmission ratio, but on the contrary the force acts directly on the part to be moved—for example by the user exerting a force on the backrest itself.

It will be understood that it is preferable for the action of force applied to the parts to take place counter to the action of an adjusting actuator, in particular a mechanical adjusting actuator. It is furthermore preferable for the adjusting actuator to be tensioned from its first position into its second position by a movement of the parts, the adjusting actuator being provided in particular as a spring. It is furthermore preferred for the movement of the adjusting mechanism to be limited in speed owing to the adjusting actuator, with the adjusting mechanism, in particular, having a damping element. In one particular embodiment, it is preferred for the adjusting actuator and the damping element to be integrated with each other, in particular in the form of a gas pressure damper. As a result, it is possible according to the invention to provide an adjusting mechanism which is particularly user-friendly. For example, the backrest of a vehicle seat can be preloaded by means of a spring or a gas pressure damper, during an inclination to the rear, in such a manner that it automatically sets itself upright if a user desires this. Similarly, the longitudinal adjustment of the seat may also have a spring or the like, with the result that, for example, the seat is "automatically" pushed forward and a user has merely to press the seat to the rear with just a small application of force to this spring, in order to set a comfortable position. An awkward "yanking" in order to move a seat forward is therefore no longer required. Provision is made according to the invention for such "automatically" moving seats or seat parts of other components of a vehicle not to move at too great a speed, which otherwise could cause a hazard, for example for children or the like. Correspondingly, provision may be made, for example, that by the actuation of an actuating element on the trunk of a vehicle, a spring-preloaded rear bench or rear seat back is unlocked, with the result that a "remote functionality", i.e. a controllability of an "automatic" seat movement or more generally of an "automatic" component movement in a vehicle, is possible starting from locations in the vehicle which are not in the vicinity of the seat or the component. This further increases the user-friendliness of such a component or such a seat, for example—for the example indicated—the loading of a trunk or in general loading compartment with a bulky and possibly heavy object.

In another embodiment, the present invention furthermore relates to a method for adjusting a component having an adjusting mechanism, in particular of a motor vehicle, wherein, in a first step, the actuation of an actuating element causes a blocking means of a device for blocking and for releasing the adjusting mechanism to be brought into a release position by means of an electric and/or pneumatic unlocking actuator, as a result of which the adjusting mechanism can be adjusted, wherein, in a second step, the action of a force on the component causes the adjusting mechanism to be brought from a first setting to a second setting, and wherein, in a third step, the blocking means of the device is brought into a blocking position and, as a result, the adjusting mechanism is blocked. The method according to the invention has the advantage that a much smaller force is required for actuating the actuating element to unlock or release the blocking means than would be required to undertake an unlocking of a manual means of unlocking the adjusting mechanism.

The invention is explained in more detail below with reference to exemplary embodiments illustrated in the drawing.

DETAILED DESCRIPTION OF THE PREFERRED EMBODIMENTS

Figure 1:
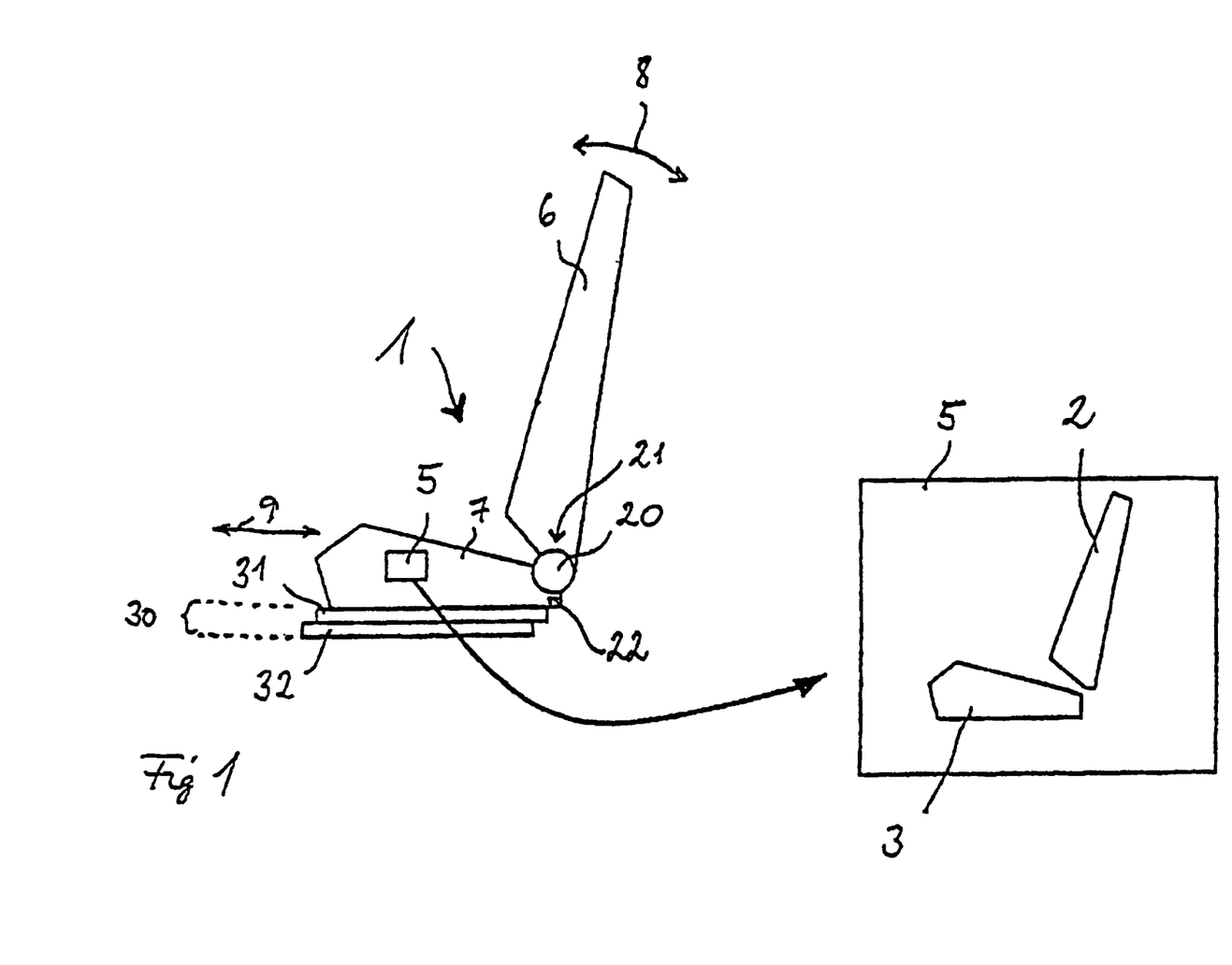
FIG. 1 shows a schematic illustration of a component with a first and a second adjusting mechanism and an operating unit illustrated on an enlarged scale.

FIG. 1 illustrates, in the left-hand part of the figure, a component 1 with a first adjusting mechanism 30 and a second adjusting mechanism 20 and an operating unit 5 (illustrated on an enlarged scale). The component 1 is provided in particular as a seat 1 of a motor vehicle (not shown), but may also be any other desired component of a motor vehicle. The first adjusting mechanism 30 comprises a first part 31 and a second part 32 which can be moved in a translatory manner with respect to each other. The second adjusting mechanism 20 comprises a first part 21 (merely indicated by means of an arrow and the reference number 21) and a second part 22 (merely indicated by means of an arrow and the reference number 22), the parts 21, 22 of the second adjusting mechanism 20 being movable in a rotary manner with respect to each other. By means of a respective blocking means (not illustrated in FIG. 1) for the two adjusting mechanisms 20, 30, the parts 31, 32 of the first adjusting mechanism 30 can be blocked by each other and the parts 21, 22 of the second adjusting mechanism 20 can be blocked by each other. The blocking of the parts 21, 22, 31, 32 with respect to one another is either continuous or discontinuous. The parts 21, 22 of the second adjusting mechanism 20 are respectively fastened to a "back" (denoted by the reference number 6) of the component 1 (illustrated by way of example as a seat 1) or to a "seat surface" (denoted by the reference number 7) of the component 1. As a result, it is possible, by exerting a force on the back 6 of the seat 1 along the direction denoted by means of a double arrow and the reference number 8, to move the parts 21, 22 of the second adjusting mechanism 20 from a first position of the parts 21, 22 with respect to each other into a second position of the parts 21, 22 with respect to each other. The first position of the parts 21, 22 with respect to each other is also referred to as first setting of the second adjusting mechanism 20 and the second position of the parts 21, 22 with respect to each other is also referred to as second setting of the second adjusting mechanism 20. Correspondingly, the parts 31, 32 of the first adjusting mechanism 30 are fastened respectively to the seat surface 7 or to a body (not illustrated) of a motor vehicle (likewise not illustrated). As a result, it is possible, by exerting a force on the seat surface 7 of the seat 1 along the direction denoted by means of a double arrow and the reference number 9, to move the parts 31, 32 of the second adjusting mechanism 30 from a first position of the parts 31, 32 with respect to each other into a second position of the parts 31, 32 with respect to each other. The first position of the parts 31, 32 with respect to each other is also referred to as first setting of the first adjusting mechanism 30 and the second position of the parts 31, 32 with respect to each other is also referred to as second setting of the first adjusting mechanism 30. The operating unit 5, which is illustrated on an enlarged scale in the right-hand part of FIG. 1, is provided on the component 1. A first actuating element 3 and a second actuating element 2 are illustrated in the enlarged illustration of the operating unit 5. The first actuating element 3 is used for actuating an unlocking actuator (not illustrated in FIG. 1) of a blocking means of the first adjusting mechanism 30, and the second actuating element 2 is used for actuating an unlocking actuator (likewise not illustrated in FIG. 1) of the blocking means of the second adjusting mechanism 20. If a user of the component 1 requires an adjustment of the first or of the second adjusting mechanism 30, 20, the actuation of the corresponding actuating element 2, 3 and a movement of the corresponding blocking means into a release position bring about an unlocking of the corresponding adjusting mechanism 20, 30, with the result that, by means of the above-described exertion of force directly or indirectly on one of the parts 21, 22, 31, 32, an adjustment or a different setting of the corresponding adjusting mechanism 20, 30 is possible. After ending the adjustment, the corresponding blocking means (not illustrated in FIG. 1) is set again into its blocking position to block the corresponding adjusting mechanism 20, 30. In this connection, the invention makes provision, in particular, for the corresponding actuating element 2, 3 to have to be actuated during the entire adjusting operation and for the corresponding blocking means to bring about a blocking of the adjusting mechanism 20, 30 directly after an actuation of the actuating element 2, 3.

Figure 2:
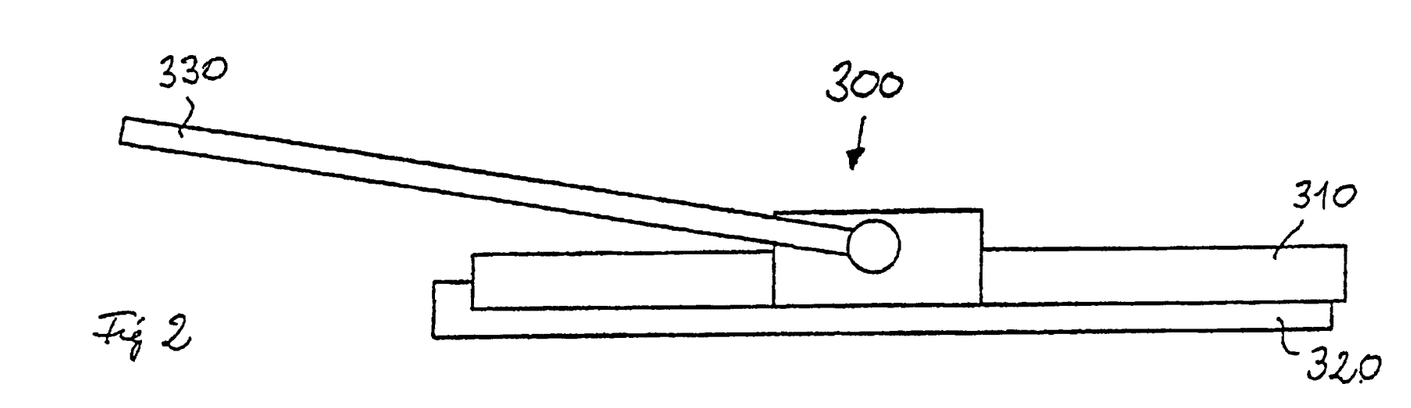
FIG. 2 shows a conventional adjusting mechanism with a manual unlocking option.

FIG. 2 illustrates a conventional adjusting mechanism 300 with a manual unlocking option. The conventional adjusting mechanism 300 likewise has parts 310, 320 which are provided movably with respect to each other. By means of an unlocking device 300, it is possible to unlock the adjusting mechanism 330, which, for example, is provided discontinuously, such that the parts 310, 320 are released and can be moved with respect to each other.

Figure 3:
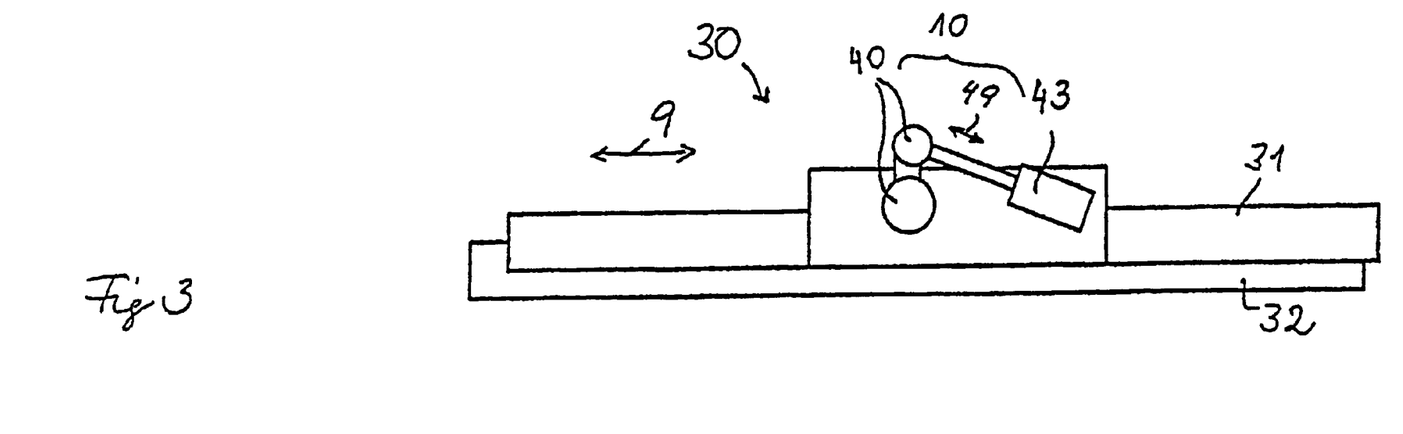
FIG. 3 shows a first adjusting mechanism according to the invention with a device according to the invention in side view.

FIG. 3 illustrates a first adjusting mechanism 30 according to the invention with a device 10 according to the invention in side view. The device 10 has a blocking means 40 which is connected to a first unlocking actuator 43. The blocking means 40 can be set in a blocking position and in a release position. In its blocking position, the blocking means 40 fixes the parts 31, 32 of the first adjusting mechanism 30 to each other. In its release position, the blocking means 40 makes it possible for the parts 31, 32 of the first adjusting mechanism 30 to be moved in a translatory manner in relation to each other. The first unlocking actuator 43 is connected as part of the device 10 to the blocking means 40 and is capable of transferring the blocking means 40 from its blocking position into its release position along the double arrow 49. According to the invention, the first adjusting mechanism 30 is provided, in particular, as a longitudinal adjuster which furthermore comprises, in particular, a non-self-locking spindle/nut system.

Figure 4:
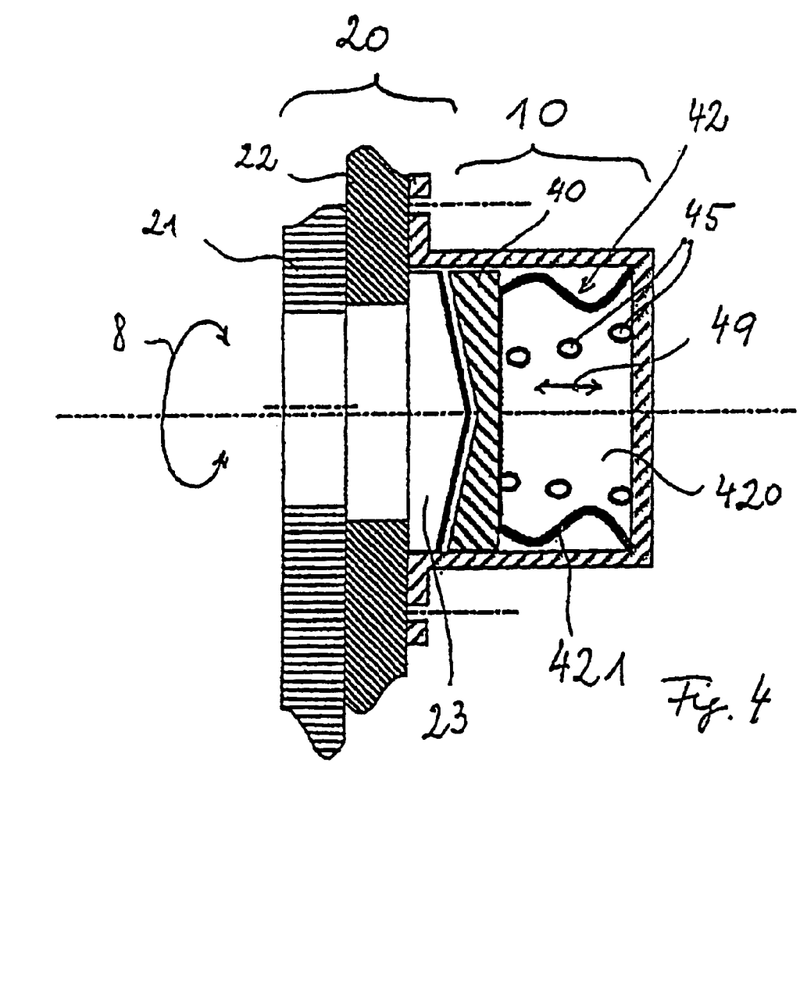
FIG. 4 shows a second adjusting mechanism according to the invention with a device according to the invention in side view and plan view.

FIG. 4 illustrates a second adjusting mechanism 20 according to the invention with a device 10 according to invention in side view in the left-hand part of FIG. 4 and in plan view in the right-hand part of FIG. 4. The second adjusting mechanism 20 has the first and second parts 21, 22 which are movable rotationally with respect to each other by the second adjusting mechanism 20. The rotational movement of the parts 21, 22 is indicated in FIG. 4 by means of a double arrow and the reference number 8. A wobble-type fitting 25, as indicated in the right-hand part of FIG. 4, is provided, for example, for the rotational movability of the two parts 21, 22. In the event of a movement of the parts 21, 22 relative to each other, an element (denoted by the reference number 23) which interacts with the device 10 according to the invention and, in particular, with the blocking means 40 also moves or rotates in order to bring about a blocking of the second adjusting mechanism 20. In the example illustrated in FIG. 4, the blocking means 40, which is provided, for example, as a frictional resistance element in relation to the element 23, is normally, i.e. when the second adjusting mechanism 20 is blocked, pressed against the element 23 by means of the locking actuator 45, which is provided as a spring 45. The friction between the blocking means 40 and the element 23 under the spring force prevents a movement of the parts 21, 22 in relation to each other. In the event of a desired adjustment of the second adjusting mechanism 20 and upon corresponding actuation of the second actuating element 2, a negative pressure is generated in a chamber 420, which is surrounded by a membrane 421 as the active surface 421 of the second unblocking actuator 42, such that the blocking means 40 is moved away from the element 23 in the direction of the double arrow (denoted by the reference number 49). As a result, the frictional effect is suppressed and the parts 21, 22 can be moved with respect to each other by means of an application of force to the parts 21, 22. According to the invention, the second adjusting mechanism 20 is therefore provided in particular such that it is not self-locking, i.e. a setting of the parts 21, 22 into different positions is possible by means of a force acting on the parts 21, 22. After the second actuating element 2 is actuated, the negative pressure in the chamber 420 is again at least largely eliminated, with the result that the frictional effect discussed leads to a blocking of the parts 21, 22. As a result, a frictional action of the blocking means 40 on the second adjusting mechanism is achieved. In a particularly advantageous manner, the ambient pressure acts on the active surface 421 of the second unlocking actuator 42 when the second unlocking actuator 42 is deactivated. FIG. 4 illustrates the device 10 according to the invention with its pneumatic, second unlocking actuator 42 as a unit which is integrated with the second adjusting mechanism 20. The supplying of the pneumatic, second unlocking actuator 42 with pneumatic energy is not illustrated in FIG. 4.

Provision is made both in the first and in the second unlocking actuator 43, 42, for the supplying with pneumatic energy to be provided either via a central compressed-air supply unit, for example from the intake tract of a combustion engine of a motor vehicle, or via a decentralized compressed-air supply unit for one or more components 1. Furthermore, provision is likewise made to use electric actuators instead of pneumatic locking or unlocking actuators 42, 43, 45. This has the advantage that the "infrastructure" necessary for supplying the actuators by way of pressure lines and the associated weight and the costs which arise can be largely omitted. According to the invention, a valve unit (not illustrated) is furthermore provided in the or on the actuator 42, 43, 45, the valve unit causing the parts 21, 22, 31, 32 to always be blocked with respect to one another when excessive accelerations occur. This can take place, for example, by the valve or the valve unit being driven by an electric signal. In an alternative embodiment of the invention, provision may also be made for the valve or the valve unit to be driven pyrotechnically. The pyrotechnic triggering can be carried out exclusively for one of the actuators 42, 43, 45 on a component 1 or alternatively a pyrotechnic triggering can be provided for a plurality of actuators for various adjusting mechanisms 20, 30, if appropriate on a plurality of different components 1. In one particularly advantageous embodiment of the invention, provision is made for a mass-containing valve piston (not illustrated) to be arranged in the valve or the valve unit in such a manner that, at high accelerations, it actuates the valve in a specific way such that a blocking of the parts 21, 22, 31, 32 is brought about. In this case, high accelerations is to be understood as meaning those accelerations which generally occur during an accident of a motor vehicle. A refinement is particularly preferred in which the mass-containing valve piston is aligned essentially in one of the main axes of the vehicle. Furthermore, a refinement is preferred in which the mass-containing valve piston bears against a rotationally symmetrical sealing surface. Furthermore, a refinement is preferred in which the valve piston can follow the sealing surface in any desired direction and can thereby react in the desired manner to accelerations in a different direction. Furthermore, a refinement is preferred in which the valve unit is integrated in the actuating valve (not illustrated) of a pneumatic actuator 42, 43, 45. Furthermore, a refinement is preferred in which the valve unit constitutes an independent unit. Furthermore, a refinement is also preferred in which the valve piston is held in a spring-loaded manner in its starting position, i.e. in the position which it assumes without a massive acceleration.

Figure 5:
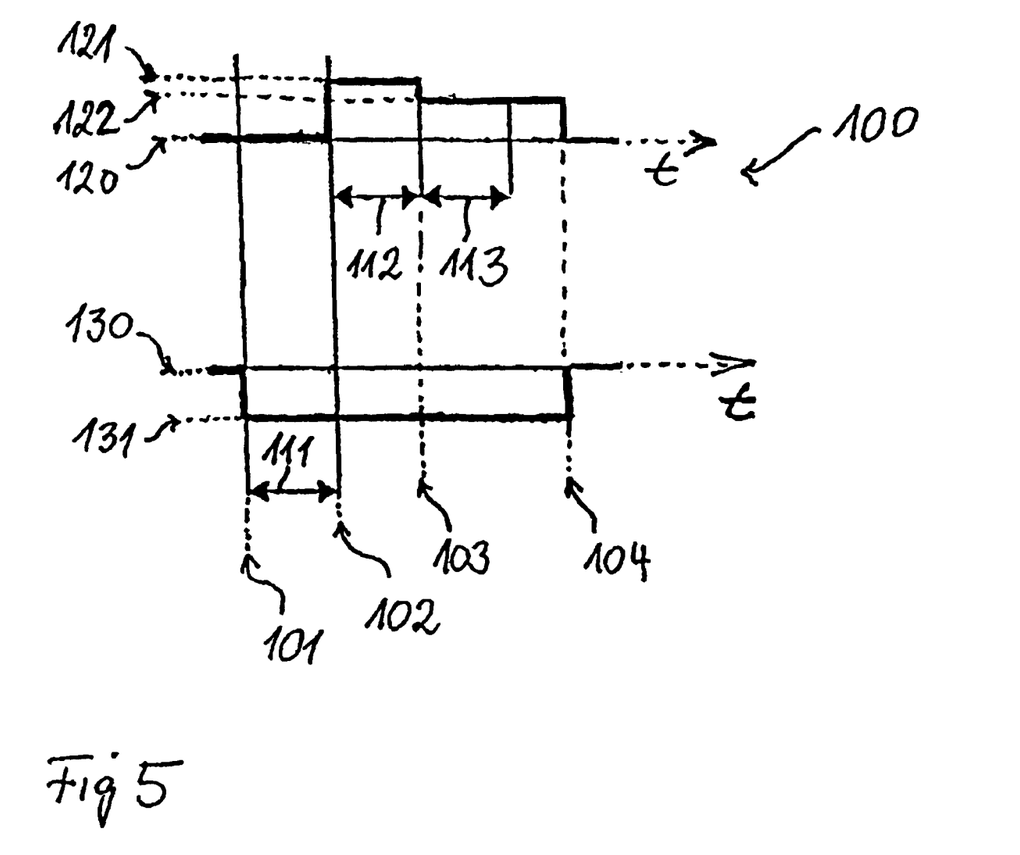
FIG. 5 shows a time diagram for driving an unlocking actuator according to the invention.

FIG. 5 illustrates a time diagram 100 for driving an unlocking actuator 42, 43 according to the invention. A first time

101, a second time 102, a third time 103 and a fourth time 104 are illustrated by means of vertical lines in each case on a time axis, which is denoted by the reference symbol "t". A voltage profile at the (preferably electrically provided) unlocking actuator 42, 43 is illustrated in the upper region of FIG. 5, and an activating or actuating profile, for example at an actuating element 2, 3 or at a detection means (not illustrated), is illustrated in the lower region of FIG. 5. In the example of FIG. 5, a setting period extends between the first time 101 and the fourth time 104. The setting period, i.e. the period during which a user desires (without interruption) to change the setting of the adjusting mechanism 20, 30, begins with a signal "flank", which can be detected at the actuating element 2, 3, between an "adjustment not desired" state, which is denoted by the reference number 130, and an "adjustment desired" state, denoted by the reference number 131. This can be followed between the first and second times 101, 102 by a dead period 111 after which, in the voltage profile of the unlocking actuator 42, 43, a transition from a deactivation level, denoted by the reference number 120, to a first drive voltage 121 takes place. After a first drive period 112, during which the blocking means 40 has been brought by the unlocking actuator 42, 43 from its blocking position into its release position, the drive voltage is reduced to the level of a second drive voltage 122, according to the invention in particular during a second drive period 113. However, according to the invention, the setting period may last beyond this, in which case the drive voltage is kept at least at the level of the second drive voltage 122 for the entire setting period, the expert understanding that this is also to be understood as, for example, a pulse-width modulation drive at, for example, the same voltage level, but with different pulse widths.

Figure 6:
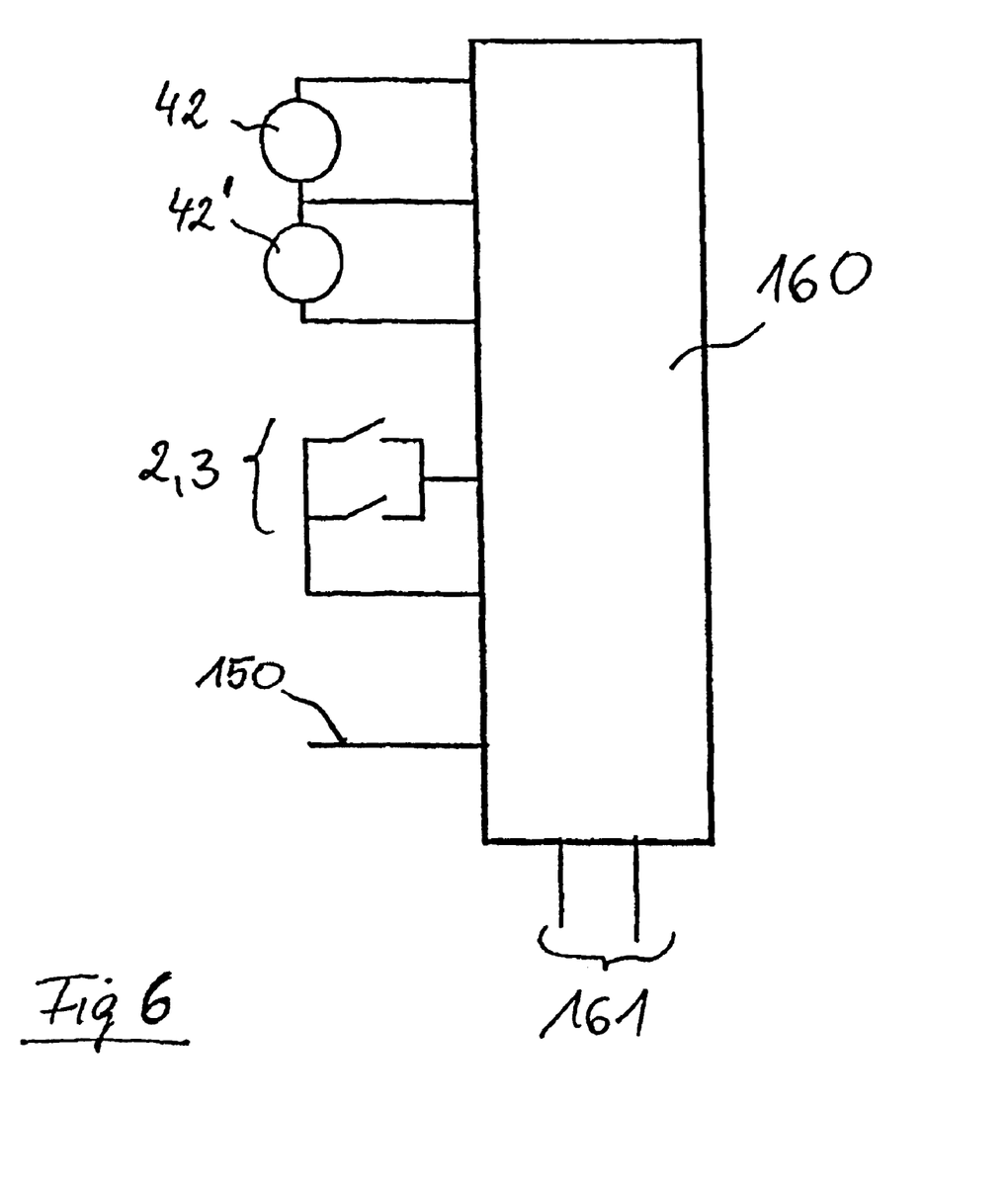
FIG. 6 shows schematically a control unit.

FIG. 6 schematically illustrates a control unit 160 for controlling the adjusting mechanism according to the invention and the device 10 according to the invention. The control unit 160 has connected to it, by way of example, the second unlocking actuator 42 and a further second unlocking actuator 42' which, in relation to the second unlocking actuator 42, is arranged, for example, mirror-symmetrically with respect to a plane (not illustrated) dividing the seat in the direction of travel of the vehicle. The two second unlocking actuators 42, 42' are driven in the same manner by the control unit 160 as a function of the signals which the control unit 160 obtains from the actuating elements 2, 3, which are likewise connected to the control unit 160, or alternatively from further sensors (not illustrated). It is illustrated by way of example that a sensor means 150 is connected to the control unit 160. If a corresponding signal is supplied by the sensor means 150 to the control unit 160, then, for example in the upper region of FIG. 5, despite the beginning of the setting period a transition from the deactivation level 120 to the first drive voltage 121 does not take place because an incorrect operation of the device 10 is detected, for example, by the sensor 150. Furthermore, FIG. 5 illustrates a voltage supply 161 of the control unit 160.

The unlocking actuators 42, 43 may also be provided in such a manner that, at the beginning of the setting period, electric or mechanical energy is stored in the unlocking actuators 42, 43 before the actual unlocking operation and is released during the actual movement of the blocking means 40. The power which is to be applied for moving the blocking means 40 and which exceeds the nominal power consumption of the unlocking actuators 42, 43 may also be provided in a particularly advantageous manner from the previously stored electric energy (for example by means of a capacitor) or mechanical energy (for example by means of a spring). For example, this includes an embodiment of the present invention in which the unlocking actuator 42, 43 has a pre-travel distance at which it can "retrieve drive", i.e. can therefore build up kinetic energy—for example in the form of rotational or translatory kinetic energy—and thus the higher initial power required to overcome the increased force requirements in the initial stage of the unlocking operation.

The blocking means 40 may be provided, for example, as a spring-loaded tappet which is thrown back automatically to lock the adjusting mechanism as soon as the drive of the locking actuator 42, 43 for maintaining the unlocking ceases, as a result of which the spring becomes effective.

A symmetrical (lateral) arrangement of for example, second unlocking actuators 42, 42' is advantageous according to the invention because a, for example, necessary coupling via a synchronizing rod is therefore dispensed with. This has the advantage that a synchronizing rod which is not present also does not have disadvantageous effects with regard to its crash behavior, and that smaller displacement travels of locking and/or unlocking actuators are required because there is a smaller amount of play—owing to a smaller number of parts arranged mechanically one behind another and coupled to one another.

By means of a self-locking design of the adjusting mechanism, it is possible, according to the invention, for the power required consistently virtually over the entire setting period in the event of an emergency for maintaining the unlocking of the adjusting mechanism and therefore for releasing the blocking means to be lower owing to the fact that forces to be taken on by the unlocking actuator 42, 43 are lower (owing to the self-locking design). In this case, it is possible, for example, for the unlocking actuator not to maintain the unlocking directly counter to the (spring) force of the blocking means 40, but rather for the unlocking actuator merely to hold the blocking means 40, which is in its release position,— for example by means of a "ratchet-like" latching mechanism—and to release the blocking means 40, for example in the event of a current failure, in such a manner that the blocking means 40 drops at least into the standby position. The continuous power drive (i.e., for example, by means of the second drive voltage 122) is therefore used primarily to the effect that the blocking means 40 does not drop back into the standby position.

It is furthermore advantageously possible that, in the case of a complete integration of the unlocking actuator 42, 43 with parts of the adjusting mechanism, a simple and compact construction, in particular without the necessity of flanging-on unlocking actuators 42, 43, is possible. This makes the installation of the vehicle component or the assembly more rapid, simple and cost-effective.

It is furthermore possible that the information concerning the preferred setting of the adjusting mechanism 20, 30 for a particular user is present—for example in the control unit 160. If the component—i.e., in particular, the vehicle seat—is firstly in the setting period and secondly "moves along" via the certain position or setting of the adjusting mechanism 20, 30, provision may be made in one preferred embodiment for the unlocking actuator 42, 43 to be driven in such a manner that, in this setting or position, the unlocking is cancelled and the blocking means 40 is therefore blocked. If such a position "which is to be sought" or is desired is not "traversed", the unlocking is not cancelled.

Furthermore, it is possible that more than one locking option is provided in the vehicle component or in the vehicle seat. In this case, a sequence of movements of the seat that are to be carried out or at least of parts thereof can then be "stored"—for example in the control unit 160, in which case, when a certain position or setting is reached, for example of the backrest of the seat, an unlocking of further locking options takes place, for example for the lateral folding away of such a seat with a folded-over backrest.

For the two last mentioned applications of the disclosed device and of the adjusting mechanism it is necessary for detection means to be designed in or on the component in such a manner that different positions of the adjusting mechanism can be recognized reliably and without any errors.

The invention claimed is:

1. A device for blocking and for releasing an adjusting mechanism, the adjusting mechanism having at least two parts which are movable relative to each other, the parts being provided in a first position with respect to each other in a first setting of the adjusting mechanism, and the parts being provided in a second position with respect to each other in a second setting of the adjusting mechanism, the device having a blocker, it being possible for the blocker to be brought at least into a blocking position and into a release position relative to the adjusting mechanism, an adjustment of the adjusting mechanism from its first setting to its second setting being provided only when the blocker is in its release position, wherein the improvement comprises an electric unlocking actuator for changing the position of the blocker between a blocking position and a release position, wherein when the unlocking actuator is activated, a first power requirement for releasing the blocker is provided, and in that, in order to maintain the releasing of the blocker, a second power requirement of the unlocking actuator is provided, the second power requirement being smaller than the first power requirement, wherein the unlocking actuator comprises a first partial unlocking actuator and a second partial unlocking actuator, the first and second partial unlocking actuators jointly bringing about the release of the blocker.

2. The device of claim 1, wherein the electric actuator comprises an electric locking actuator.

3. The device of claim 1, wherein the electric actuator comprises a spring-based, mechanical locking actuator.

4. The device of claim 3, wherein the electric actuator for changing the position of the blocker from its blocking position to its release position can be carried out counter to an action of force of the locking actuator.

5. The device of claim 1, wherein when the blocker is in the blocking position, a frictional, non-positive action of the blocker is applied to the adjusting mechanism.

6. The device of claim 1, wherein the first power requirement of the unlocking actuator is realized by a first drive voltage, and the second power requirement of the unlocking actuator is realized by a second drive voltage.

7. The device of claim 1, wherein the unlocking actuator can be driven with the first power requirement at maximum during a predetermined overload period.

8. The device of claim 1, wherein one of the first and second power requirements is at least partially constant in time.

9. The device of claim 1, wherein the first power requirement is provided during a first drive period and the second power requirement is provided during a second drive period for driving the unlocking actuator.

10. The device of claim 1, wherein a repetition rate of an activation of the unlocking actuator is limited.

11. The device of claim 1, wherein the blocker can be moved to a release position by deactivation of the unlocking actuator and blocker can be brought into a standby position by deactivation of the unlocking actuator.

12. The device of claim 1, wherein when there is a loss of voltage by the device, the unlocking actuator is deactivated.

13. The device of claim 11, further comprising a signaling device for signaling the presence of the blocking means in the standby position.

14. The device of claim 1, wherein the unlocking actuator comprises an acceleration sensor for deactivating the unlocking actuator.

15. The device of claim 1, further comprising an actuating element for actuation of the unlocking actuator.

16. The device of claim 15, wherein the actuating element is provided as a detector for detecting the end of the setting period.

17. The device of claim 15, further comprising a sensor assigned to the device for providing an inhibiting signal to prevent activation of the unlocking actuator.

18. The device of claim 15, wherein the sensor is selected from one of a seat occupant sensor and a body contact sensor.

19. An adjusting mechanism having a first part and having a second part, the parts being provided in a first position with respect to one another in a first setting of the adjusting mechanism, and the parts being provided in a second position with respect to one another in a second setting of the adjusting mechanism, the adjusting mechanism interacting with a device as claimed in claim 1.

20. A method for adjusting a component having an adjusting mechanism, in particular of a motor vehicle, wherein, in a first step, the actuation of an actuating element causes a blocker of a device for blocking and for releasing the adjusting mechanism to be brought into a release position by means of an electric unlocking actuator, as a result of which the adjusting mechanism can be adjusted, wherein, in a second step, the action of a force on the component causes the adjusting mechanism to be brought from a first setting into a second setting, and wherein, in a third step, the blocker of the device is brought into a blocking position and, as a result, the adjusting mechanism is blocked, wherein when the unlocking actuator is activated, a first power requirement for releasing the blocker is provided, and in that, in order to maintain the releasing of the blocker, a second power requirement of the unlocking actuator is provided, the second power requirement being smaller than the first power requirement, wherein the unlocking actuator comprises a first partial unlocking actuator and a second partial unlocking actuator, the first and second partial unlocking actuators jointly bringing about the release of the blocker.

* * * * *

UNITED STATES PATENT AND TRADEMARK OFFICE
CERTIFICATE OF CORRECTION

| | | |
|---|---|---|
| PATENT NO. | : 7,667,345 B2 | Page 1 of 1 |
| APPLICATION NO. | : 10/556515 | |
| DATED | : February 23, 2010 | |
| INVENTOR(S) | : Mario Budweg et al. | |

It is certified that error appears in the above-identified patent and that said Letters Patent is hereby corrected as shown below:

Column 1, line 1, the title should read:

VEHICLE SEAT ADJUSTING MECHANISM

Signed and Sealed this

Twenty-ninth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,667,345 B2 Page 1 of 1
APPLICATION NO. : 10/556515
DATED : February 23, 2010
INVENTOR(S) : Mario Budweg et al.

It is certified that error appears in the above-identified patent and that said Letters Patent is hereby corrected as shown below:

Title Page, Item (54) and at Column 1, lines 1-3, the title should read:

VEHICLE SEAT ADJUSTING MECHANISM

This certificate supersedes the Certificate of Correction issued June 29, 2010.

Signed and Sealed this

Twentieth Day of July, 2010

David J. Kappos
*Director of the United States Patent and Trademark Office*

UNITED STATES PATENT AND TRADEMARK OFFICE
CERTIFICATE OF CORRECTION

PATENT NO. : 7,667,345 B2  Page 1 of 1
APPLICATION NO. : 10/556515
DATED : February 23, 2010
INVENTOR(S) : Budweg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1086 days.

Signed and Sealed this

Seventh Day of December, 2010

David J. Kappos
*Director of the United States Patent and Trademark Office*